(12) United States Patent
Kobayashi et al.

(10) Patent No.: US 12,093,585 B2
(45) Date of Patent: Sep. 17, 2024

(54) PRINTING SYSTEM AND NON-TRANSITORY COMPUTER-READABLE STORAGE MEDIUM STORING PRINT CONTROL PROGRAM

(71) Applicant: SEIKO EPSON CORPORATION, Tokyo (JP)

(72) Inventors: Ayako Kobayashi, Okaya (JP); Yuka Kobayashi, Shiojiri (JP); Yuto Fukuchi, Matsumoto (JP); Yuko Ishifuro, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/496,451

(22) Filed: Oct. 27, 2023

(65) Prior Publication Data

US 2024/0143251 A1 May 2, 2024

(30) Foreign Application Priority Data

Oct. 28, 2022 (JP) ................................. 2022-173186

(51) Int. Cl.
*G06F 3/12* (2006.01)
(52) U.S. Cl.
CPC .......... *G06F 3/1242* (2013.01); *G06F 3/1253* (2013.01); *G06F 3/126* (2013.01)

(58) Field of Classification Search
CPC ....... G06F 3/1242; G06F 3/1253; G06F 3/126
See application file for complete search history.

(56) References Cited

U.S. PATENT DOCUMENTS

| 7,304,753 | B1* | 12/2007 | Richter | ................ | G06F 3/1259 358/1.14 |
| 2010/0027054 | A1* | 2/2010 | Reddy | ................ | H04N 1/00233 358/1.15 |
| 2012/0224204 | A1* | 9/2012 | Yamagishi | ......... | G06K 15/1882 358/1.13 |
| 2015/0116764 | A1* | 4/2015 | Mori | ........................ | G06F 3/126 358/1.15 |
| 2016/0139761 | A1* | 5/2016 | Grosz | ................ | H04N 1/00145 715/769 |
| 2021/0370685 | A1 | 12/2021 | Endo | | |

FOREIGN PATENT DOCUMENTS

JP 2021187025 A 12/2021
JP 2022039737 A 3/2022

* cited by examiner

*Primary Examiner* — John R Wallace
(74) *Attorney, Agent, or Firm* — Pramod Chintalapoodi

(57) ABSTRACT

A printing system including a display section that displays a print preview based on a print setting including specification of a print medium set by a user and image data, a changing section that changes the print setting in accordance with an instruction of an administrator, and a confirmation section that causes a printer to execute printing in accordance with an agreement between the user and the administrator is configured.

11 Claims, 8 Drawing Sheets

FIG. 7

| CONFIRMED CASE | TEMPORARY ORDER 2 | DELIVERED 3 | | | | | |
|---|---|---|---|---|---|---|---|
| REFERENCE NUMBER | PRINT MEDIUM | NUMBER OF COPIES | PICK-UP TIME | STATUS | PROCESSING METHOD | RECEPTION DATA AND TIME | OPTION |
| **** | PHOTOBOOK | 2 | 15:30 | IN PREPARATION | | 10/13 13:30 | |
| **** | T-SHIRT | 1 | 16:30 | IN PREPARATION | | 10/13 15:00 | |

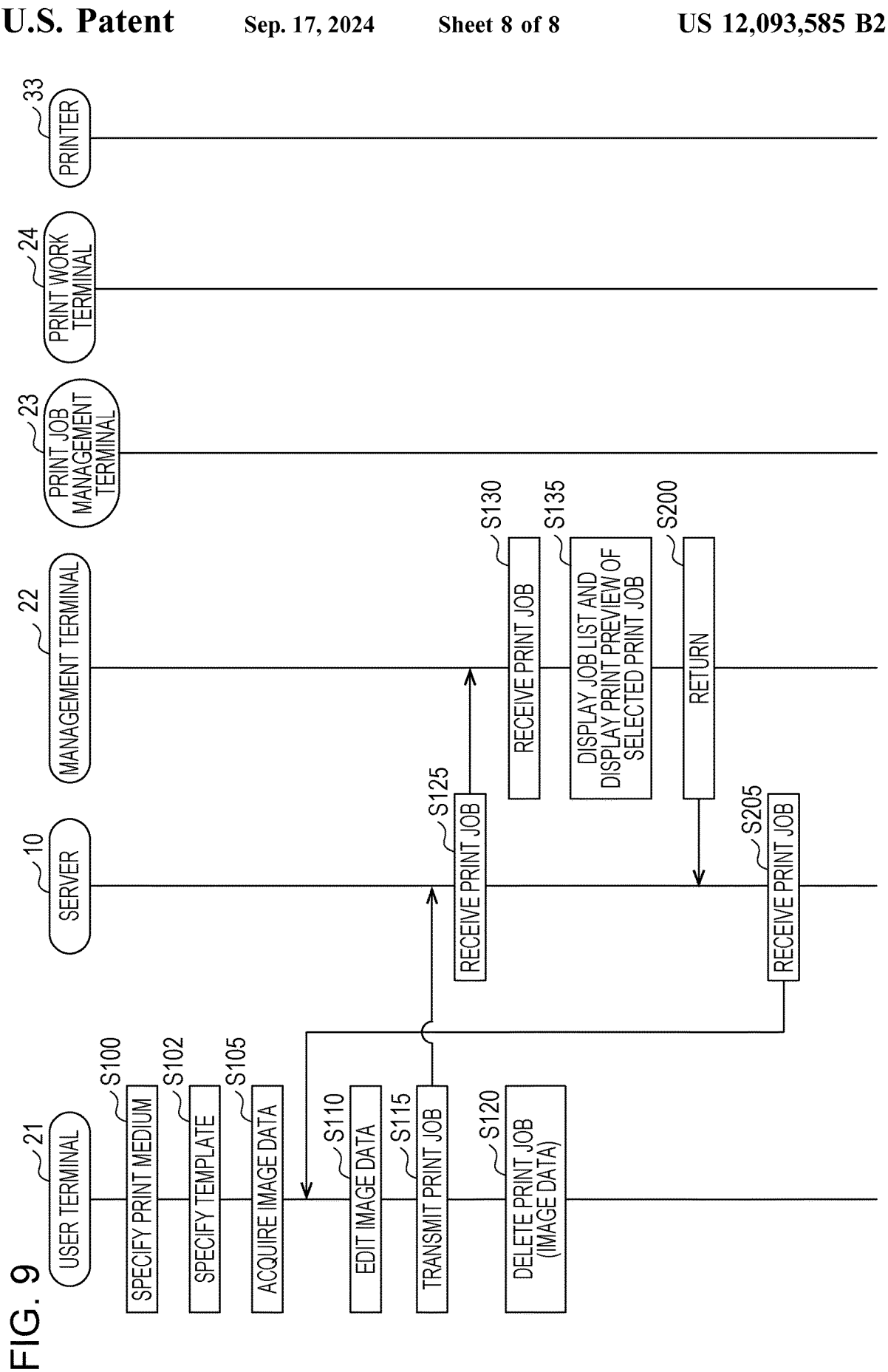

PRINTING SYSTEM AND NON-TRANSITORY COMPUTER-READABLE STORAGE MEDIUM STORING PRINT CONTROL PROGRAM

The present application is based on, and claims priority from JP Application Serial Number 2022-173186, filed Oct. 28, 2022, the disclosure of which is hereby incorporated by reference herein in its entirety.

BACKGROUND

1. Technical Field

The present disclosure relates to a printing system, a non-transitory computer-readable storage medium storing a print control program, and a method for producing a printed material.

2. Related Art

A technology for performing printing on various other media than a paper medium has been known. For example, JP-A-2022-39737 describes printing on a can surface. JP-A-2021-187025 describes printing on a medium including a mirror reflection layer.

When a user is not familiar to printing on some other medium than a paper medium, the user cannot perform setting of printing properly, and thus, there is a probability that printing is not performed as an image of the user.

SUMMARY

A printing system that solves the above-described problem includes a user terminal including a specifying section that causes a user to specify a print medium, an acquisition section that acquires image data, and a transmission section that transmits a print job including the print medium specified by the user and the image data, a management terminal including a reception section that receives the print job, a display section that displays a list of the received print jobs such that one of the print jobs is selected and displays a print preview based on the print medium and the image data included in the selected print job, a changing section that changes the print job in accordance with an instruction, and a confirmation section that confirms execution of printing based on the print job in accordance with an agreement between the user and an administrator, and a printer including a printing section that performs printing based on the confirmed print job.

A non-transitory computer-readable storage medium stores a print control program that solves the above-described program, and the print control program causes a user terminal to function as a specifying section that causes a user to specify a print medium, an acquisition section that acquires image data, and a transmission section that transmits a print job including the print medium specified by the user and the image data, causes a management terminal to function as a reception section that receives the print job, a display section that displays a list of the received print jobs such that one of the print jobs is selected and displays a print preview based on the print medium and the image data included in the selected print job, a changing section that changes the print job in accordance with an instruction, and a confirmation section that confirms execution of printing based on the print job in accordance with an agreement between the user and an administrator, and causes a printer to function as a printing section that performs printing based on the confirmed print job.

A method for producing a printed material that solves the above-described problem includes causing a user to specify a print medium, acquiring image data, and transmitting a print job including the print medium specified by the user and the image data to a management terminal by a user terminal, receiving the print job, displaying a list of the received print jobs such that one of the print jobs is selected, displaying a print preview based on the print medium and the image data included in the selected print job, changing the print job in accordance with an instruction, and confirming execution of printing based on the print job in accordance with an agreement between the user and an administrator by a management terminal, and performing printing based on the confirmed print job by a printer.

BRIEF DESCRIPTION OF THE DRAWINGS

FIG. 7 is a view illustrating an example of a temporary order job list screen.
FIG. 9 is a sequence diagram of print control processing.

DESCRIPTION OF EMBODIMENTS

Embodiments of the present disclosure will be described below in the following order.
(1) Configuration of Printing System
(1-1) Configuration of Server
(1-2) Configuration of Terminal
(1-3) Configuration of Printer
(2) Print Control Processing
(3) Other Embodiments

(1) Configuration of Printing System

Figure 1:
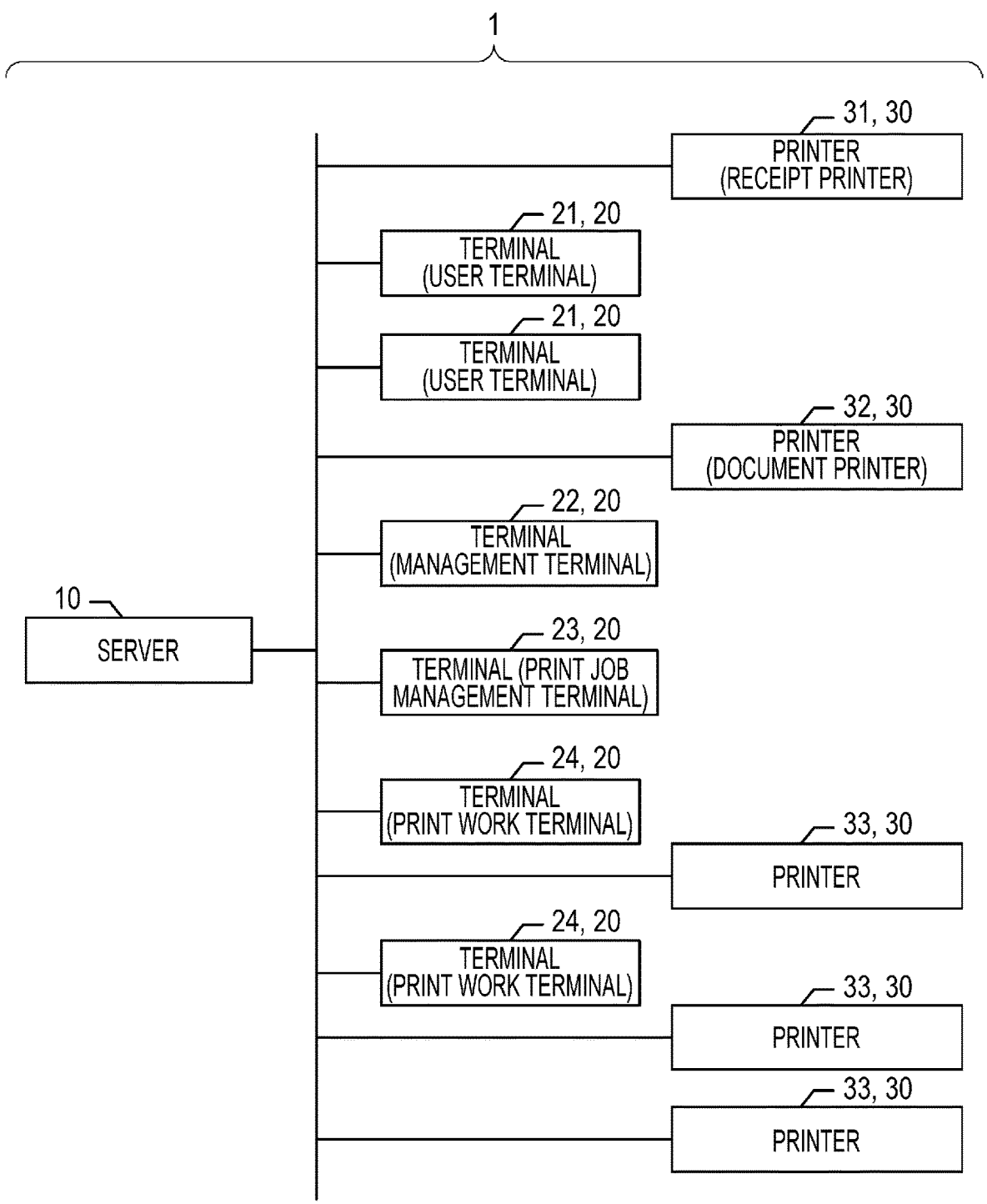
FIG. 1 is a block diagram of a printing system.

FIG. 1 is a block diagram schematically illustrating an example of a printing system according to an embodiment of the present disclosure. A printing system 1 includes a server 10, a terminal 20, and a printer 30. The number of each device illustrated in FIG. 1 is an example and is not limited thereto. For example, a plurality of terminals 20 and a plurality of printers 30 are illustrated in FIG. 1, but the number of terminals 20 and the number of the printer 30 are not limited to the number of terminals 20 and the number of the printer 30 illustrated in FIG. 1. One server 10 is illustrated in FIG. 1, but the printing system 1 may include a plurality of servers 10. These devices can communicate with each other via a network. The network may be in various forms, and may be a local network. The devices that are present in positions physically distant from each other may communicate with each other via the Internet or the like.

In this embodiment, the terminal 20 and the printer 30 are installed in a store, such as a photo studio, a variety store, or the like, as an example. In the store, a print service in which an image designed using a photograph or the like designated by a user is printed on a print medium (mug, T-shirt, smartphone, pinback button, paper with various sizes and materials, or the like) selected by the user who is a customer of the store and souvenirs, original goods of the user, or the like are produces is provided.

The terminal 20 includes a terminal (user terminal 21) used by the user who is a customer of the store for designing a print image, a terminal (management terminal 22) used by a staff (administer) who responds to the user, a terminal (print job management terminal 23) that performs management of a print job, and a terminal (print work terminal 24) that is a terminal in which a printer driver and a print application for each printer are installed and that is used by a print worker.

As the printer 30, the printing system 1 incudes a receipt printer 31 used for printing a temporary order reference number, a document printer 32 used for printing an order form, and a printer 33 used for printing an image designed by the user on a print medium selected by the user. The printer 33 includes, for example, a mini laboratory machine suitable for printing on photographic paper, a sublimation transfer printer that can perform printing on sublimation transfer paper that is press-bonded to a mug (pottery), a pinback button, a smartphone, or the like, a large format printer suitable for printing on a large size paper medium, such as a poster or the like, a direct-to-garment (DTG) printer that can directly print a fabric product, such as a T-shirt or the like, or the like.

The user operates the user terminal 21 to design an image to be printed on a print medium using a design application installed in the user terminal 21. Specifically, the user selects a print medium and selects a template corresponding to the print medium using the design application. Furthermore, the user designates a desired photograph using the design application to design an image to be printed on the print medium using the template. The user can transmit a photograph, for example, stored in a mobile terminal owned by the user himself/herself to the user terminal 21 and can designate the transmitted photograph. The user can designate the number of copies and request printing of the image designed by the user himself or herself to the selected print medium.

Incidentally, the user can design a print image using the design application of the user terminal 21 but, for example, when the user selects a print medium other than paper, there is a probability that a finished result of an actual print is different from user's image of a finished result. Therefore, the printing system according to this embodiment is configured such that, even after the user once requests (makes a temporary order for) printing, the user can easily modify a design.

A configuration of each device of the printing system 1 that realizes such a print service will be described below.

(1-1) Configuration of Server

Figure 2:
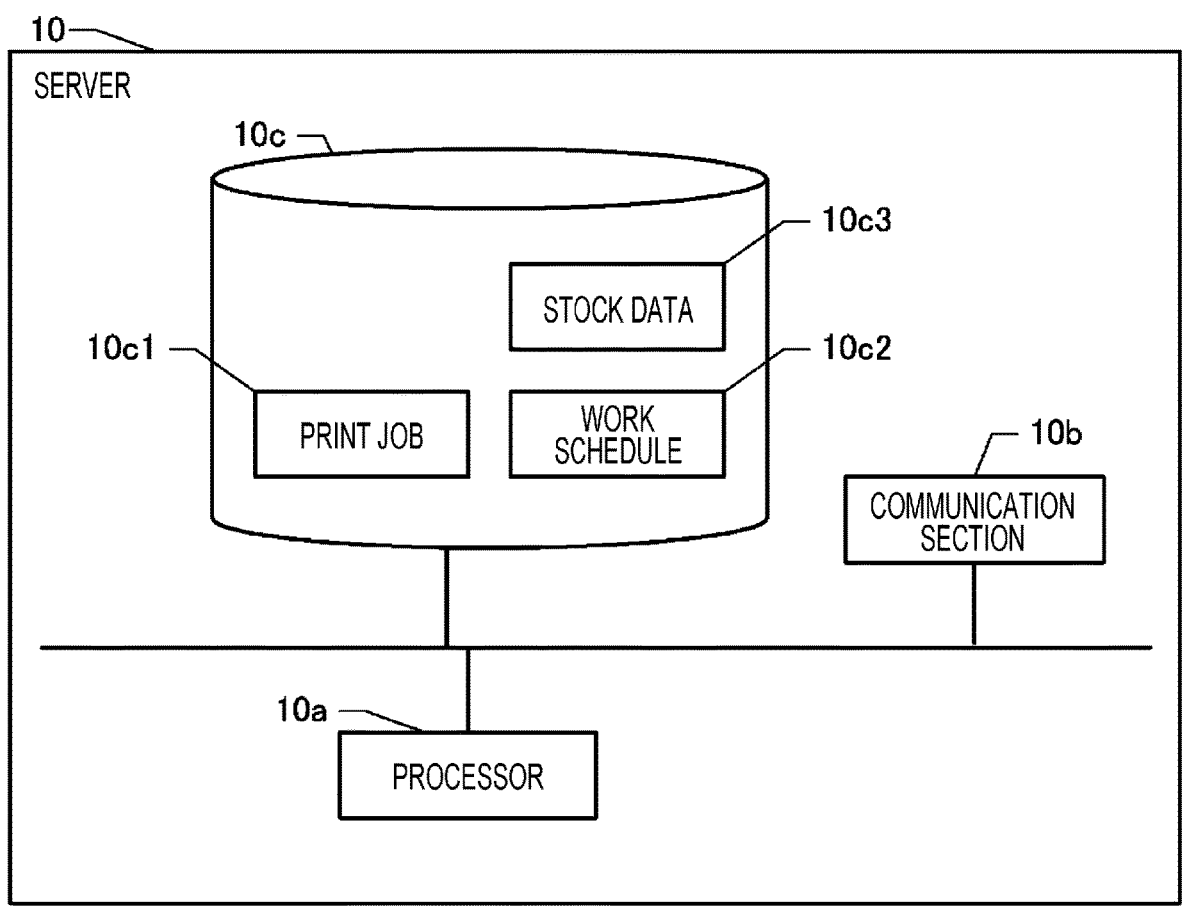
FIG. 2 is a block diagram illustrating a configuration of a server.

FIG. 2 is a block diagram illustrating a configuration of the server 10. The server 10 includes a processor 10a, a communication section 10b, and a nonvolatile memory 10c. The processor 10a includes a CPU, a ROM, a RAM, or the like, which are not illustrated, can execute various programs recorded in the nonvolatile memory 10c to control each section of the server and each device coupled to the network. Note that the processor 10a may be formed of a single chip, may be formed of a plurality of chips, and may be configured as an SoC with various functional blocks that cause the printer to operate. Moreover, for example, instead of the CPU, an ASIC may be used, and a configuration in which the CPU and an ASIC cooperate with each other may be employed. When each device in this embodiment includes a processor, similar to the processor 10a, the processor can be realized in various forms.

The communication section 10b includes a communication interface that performs communication with an external device in accordance with various wired or wireless communication protocols. The server 10 can communicate with other devices via the communication section 10b. Note that the communication section 10b may include an interface that communicates with various types of removable memory attached to the server 10.

Various types of information are stored in the nonvolatile memory 10c of the server 10. For example, stock data 10c3 for a print medium, a work schedule 10c2 related to printed material production, a print job 10c1, or the like is stored in the nonvolatile memory 10c.

The stock data 10c3 is data indicating the number of print media in stock in the store and is recorded for each of types (size, color, shape, material, or the like) of print media. The work schedule 10c2 is information indicating a schedule of each printer 33, a pre-processing device, a post-processing device, or the like. In this embodiment, upon receiving the print job 10c1 of a temporary order, the server 10 tentatively holds the schedule of the printer 33 that produces an item for the order and, when pre-processing or post-processing is needed, tentatively holds a scheduled printing period, a pre-processing performing period, or a post-processing performing period in an available time slot in a corresponding one of the schedules of the pre-processing device and the post-processing device. Specifically, for example, when an item that needs pre-processing before printing is ordered, a scheduled pre-processing performing period corresponding to a time of the pre-processing for the order is tentatively added to an available time slot in the schedule of the pre-processing device. Furthermore, the scheduled print period corresponding to a time required for printing for the order is tentatively added to the schedule of the printer 33 that performs printing for the order (when the pre-processing is performed, the scheduled print period is added at or after an end time of the pre-processing). Furthermore, for an item that needs post-processing after printing, a scheduled post-processing performing time corresponding to a time required for the post-processing is tentatively added to an available time slot in the schedule of the post-processing device at or after an end time of printing. For example, a pick-up time when the user can receive a finished item is set, based on a print end time for an item that does not need the post-processing, and is set based on an end time of the post-processing for an item that needs the post-processing.

The print job 10c1 includes designed image data, a type of the print medium, the number of copies, or the like. Using the design application installed in the user terminal 21, the user selects a print medium, selects image data to be printed, and designs a print image using a template corresponding to the selected printing medium and the image data. When the user temporarily orders a print image designed by the user, the print job 10c1 including the print image, the type of the print medium, the number of copies, or the like is transmitted to the server 10 and is recorded in the nonvolatile memory 10c of the server 10. Upon receiving the nonvolatile memory 10c of the temporary order from the user terminal 21, the server 10 assigns a reference number to the print job 10c1 and records the reference number in association with the print job 10c1 in the nonvolatile memory 10c. When the user places a temporary order, the server 10 generates a password and records the password in association with the reference number of the print job 10c1 in the nonvolatile memory 10c. The server 10 generates the print data including the reference number, the password, and a message that urges the user to go to a reception counter, and causes the receipt printer 31 to print a receipt. The user receives the receipt from the receipt printer 31 and goes to the reception counter.

The server 10 transmits the temporarily ordered print job 10c1 to the management terminal 22. At the reception counter, the administrator that manages the order responses to the user. Referring to the reference number, the administrator can associate the user who holds the receipt with the reference number printed thereon with the print job 10c1 temporarily ordered by the user. The administrator can operate the management terminal 22 to check contents of the print job 10c1 as consulting with the user. As will be described later, the administrator can operate the management terminal 22 to change the contents of the print job 10c1 and return the print job 10c1 to the user terminal 21 so that the user can re-edit the contents. As a matter of course, when change of the temporarily ordered print job 10c1 is not necessary, change in the management terminal 22 may not be performed and the print job 10c1 may not be returned to the user terminal 21.

When the administrator and the user agree on the contents of the print job 10c1, the administrator can operate the management terminal 22 to confirm the order of the print job 10c1. As used herein, confirmation of a temporary order will be also referred to as an actual order. The confirmed print job 10c1 is transmitted from the management terminal 22 to the server 10 and is recorded in the nonvolatile memory 10c. Upon receiving the print job 10c1 of the actual order, the server 10 assigns an order number to the print job 10c1 and records the order number in association with the print job 10c1. Note that the order number and the reference number are different numbers in this embodiment, but may be the same number in other embodiments. In this embodiment, it is assumed that the reference number is, for example, a short number indicating an order of reception of the temporary order in a day at one store and the order number is, for example, a longer number than the reference number with which a store, date, or the like can be uniquely identified.

When the order is confirmed, the server 10 transmits the print job 10c1 to the print job management terminal 23 and instructs printing. The server 10 confirms a tentatively held schedule as a finalized schedule in a work schedule 10c2. When there is a change from the schedule of the temporary order, the work schedule 10c2 is updated with contents after the change. The server 10 updates the stock data 10c3 by subtracting the number of a print medium used for the confirmed print job 10c1 from the stock number of the print medium.

(1-2) Configuration of Terminal

Figure 3:
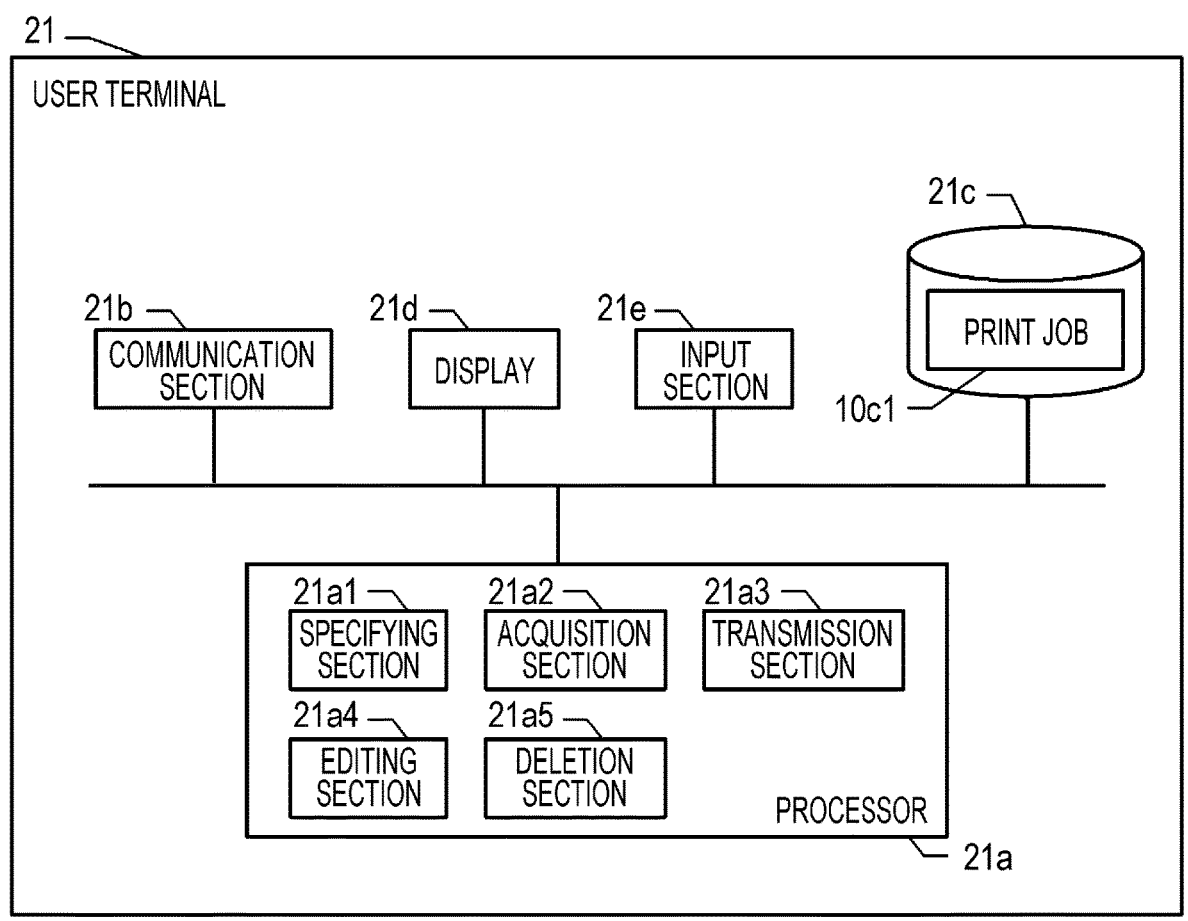
FIG. 3 is a block diagram illustrating a configuration of a user terminal.

Next, a configuration of the terminal 20 will be described. A hardware configuration of the terminal 20 is common between the user terminal 21, the management terminal 22, the print job management terminal 23, and the print work terminal 24. FIG. 3 is a block diagram illustrating a configuration of the user terminal 21. The user terminal 21 includes a processor 21a, a communication section 21b, a nonvolatile memory 21c, a display 21d, and an input section 21e. The processor 21a includes a CPU, a ROM, a RAM, or the like, which are not illustrated, and can execute various programs recorded in the nonvolatile memory 21c to control each component of the user terminal 21.

The communication section 21b includes a communication interface that performs communication with an external device in accordance with various wired or wireless communication protocols. The user terminal 21 can communicate with other devices via the communication section 21b. The communication section 21b includes an interface that communicates with various types of removable memory attached to the user terminal 21.

The display 21d is a display device that displays an arbitrary image. The input section 21e is a device via which the user performs an input operation and is formed of, for example, a keyboard, a mouse, a touch panel, or the like. In any case, the user can operate the input section 21e to input an intention of the user while visually checking an image and a character displayed on the display 21d.

The design application is installed in the user terminal 21, the processor 21a of the user terminal 21 executes the design application to function as a specifying section 21a1 that causes the user to specify a print medium, an acquisition section 21a2 that acquires image data, a transmission section 21a3 that transmits a print job including the print medium specified by the user and image data to the management terminal 22, an editing section 21a4 that edits the image data in accordance with an instruction of the user, and a deletion section 21a5 that deletes the image data after transmission.

Figure 4:
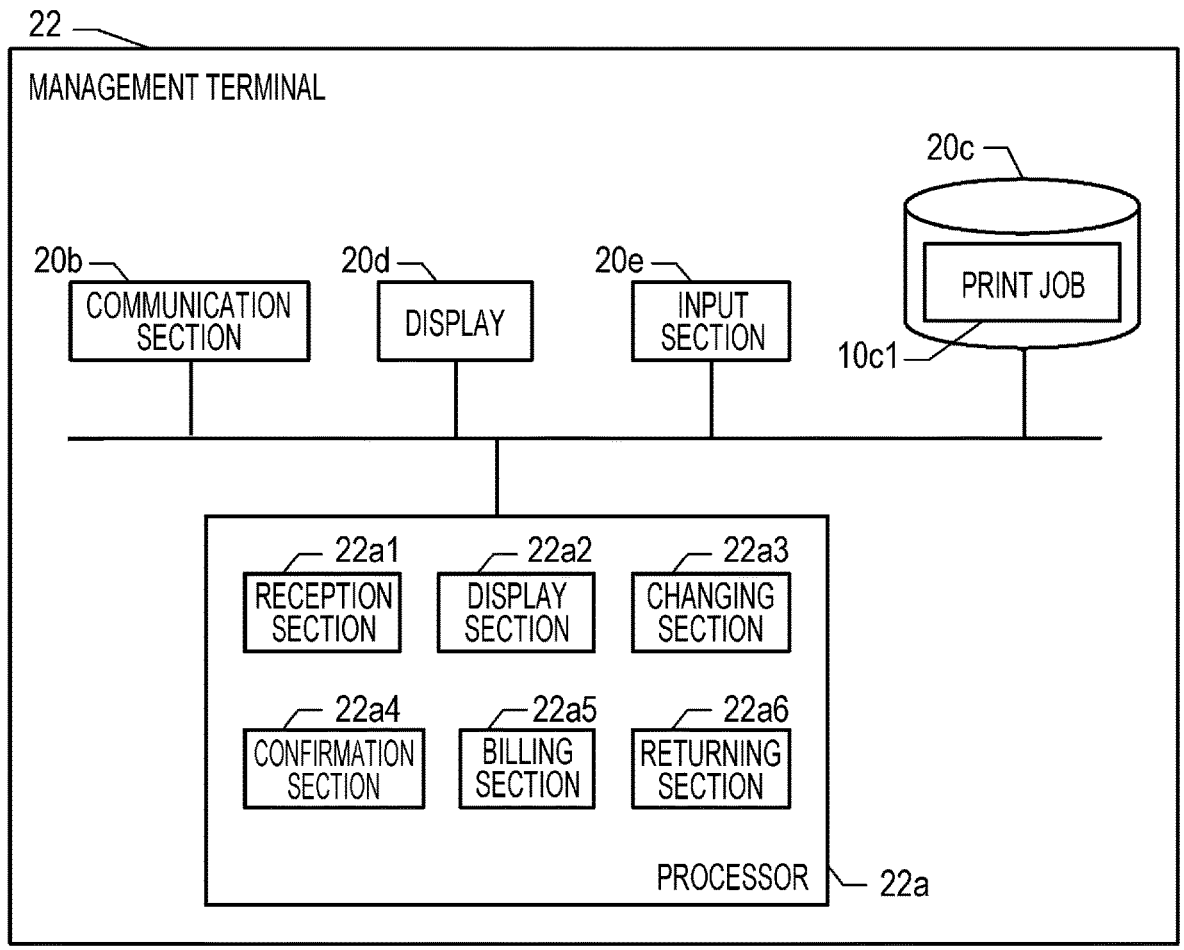
FIG. 4 is a block diagram illustrating a configuration of a management terminal.

FIG. 4 is a block diagram illustrating a configuration of the management terminal 22. A hardware configuration is common between the management terminal 22 and the user terminal 21, and therefore, description thereof will be partially omitted. The administrator operates the management terminal 22 to instruct changing the print job 10c1 received from the server 10, returning the print job 10c1 to the user terminal 21, and confirming an order, or the like. That is, a processor 22a of the management terminal 22 functions as a reception section 22a1 that receives a print job, a display section 22a2 that displays a list of received print jobs such that one of the print jobs is selected, displays a list of selected print jobs 10c1 such that one of the print jobs 10c1 is selected, and displays a print preview based on a print medium and image data included in the selected print job, a changing section 22a3 that changes the print job in accordance with an instruction, and a confirmation section 22a4 that confirms execution of printing based on the print job in accordance with an agreement between the user and the administrator. Furthermore, the processor 22a functions as a returning section 22a6 that returns the print job to the user terminal. Details of these components will be described later.

Upon confirming an order by the function of the confirmation section 22a4, the management terminal 22 transmits the print job 10c1 indicating the confirmed order to the server 10. When returning is instructed by the administrator, the management terminal 22 transmits the print job 10c1 to the server 10 and causes the server 10 to return the print job 10c1 to the user terminal 21 by a function of the returning section 22a6.

Upon receiving a print instruction from the server 10, the print job management terminal 23 (see FIG. 1) selects the print work terminal 24 corresponding to the printer 33 that executes the print job and transmits the print job to the print work terminal 24. Selection of the print work terminal 24 may be manually performed by the print worker. A printer driver and a print application of each printer 33 are installed in the print work terminal 24 (see FIG. 1). The print worker can perform various pre-processing works, such as color matching before printing or the like, using these programs.

The print worker operates the print work terminal 24 to select a printer that performs printing of the print job and select a print setting used for printing of the print job. Note that the above-described components may be performed at the print job management terminal 23. For example, the processor of the print job management terminal 23 or the print work terminal 24 presents a list of printers 33 that can execute the print job and acquires a printer 33 selected from the list by the print worker. For example, the processor of the print job management terminal 23 or the print work terminal 24 presents a list of a plurality of print settings related to execution of the print job and acquires a print setting selected from the list by the print worker. In the print work terminal 24, the image data of the print job is converted to a print format in the designated printer 33, based on the print setting and outputs the converted image data with information of the number of copies to the printer 33. When printing is finished, the print work terminal 24 informs the server 10 of progress information indicating that printing is finished via the print job management terminal 23. Note that the print setting includes print medium specification, an image arrangement position, or the like.

(1-3) Configuration of Printer

Figure 5:
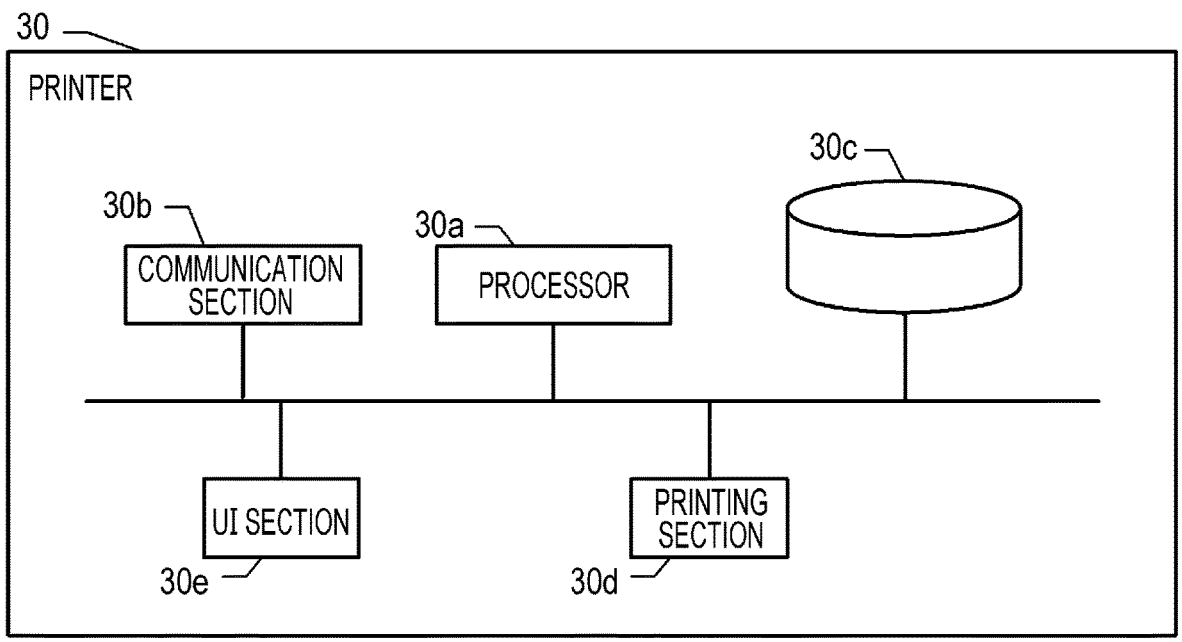
FIG. 5 is a block diagram illustrating a configuration of a printer.

FIG. 5 is a block diagram illustrating a configuration of the printer 30. As the printer 30, the printing system 1 includes the receipt printer 31, the document printer 32, and the printer 33 that performs printing of an item. The printer 30 includes a processor 30a, a communication section 30b, a nonvolatile memory 30c, a printing section 30d, and a UI section 30e. The processor 30a includes a CPU, a ROM, a RAM, or the like, which are not illustrated, and can execute various programs recorded in the nonvolatile memory 30c to control each component of the printer 30.

The communication section 30b includes a communication interface that performs communication with an external device in accordance with various wired or wireless communication protocols. The printer 30 can communicate with other devices via the communication section 30b. Note that the communication section 30b may include an interface that communicates with various types of removable memory attached to the printer 30.

The printing section 30d differs among the receipt printer 31, the document printer 32, and the printer 33. The printing section 30d is a member that executes printing and performs printing on various media including plain paper, photographic paper, sublimation transfer paper, fabric, or the like, in accordance with various printing methods including an ink jet method. For example, the printing section 30d of the receipt printer 31 performs printing on rolled paper having a pre-selected paper width as a receipt. The printing section 30d of the document printer 32 performs printing on cut paper, such as, for example, A4 paper or the like. The printing section 30d of the printer 33 performs printing on various print media, such as a stereoscopic print medium and a sheet-like medium, handled in the store. The printing section 30d includes an actuator, various devices, a sensor, a drive circuit, a machine part, or the like, used for executing printing on various media. As the sensor, sensors that detect various detection targets that differ among the printers 30 are provided. The detection target is not limited and examples of the sensor include, for example, a sensor that detects a remaining amount of each type of the media, a sensor that detects an ink remaining amount for each color used for printing, or the like.

The UI section 30e includes at least one of a touch panel display, various keys, a switch, an LED, or the like. The touch panel display includes a display panel that displays various types of information, such as, for example, a status of the printer 30, the ink remaining amount, or the like, and a touch detection panel superimposed on the display panel, and detects a touch operation. The LED performs lighting or flicker display indicating the status of the printer 30 or the like. The processor 30a can acquire contents of an operation of the administrator via the UI section 30e. The processor 30a can inform the administrator of various types of information by displaying the various types of information on a display of the UI section 30e.

In this embodiment, in accordance with an order from the user and a print instruction of the administrator, the printer 33 produces an ordered printed material in the store, such as a photo studio, a variety store, of the like. The processor 30a of the printer 33 acquires data converted to the print format of the printer 33 via the communication section 30b, controls the printing section 30d, based on the data, and performs printing. When printing is finished, the processor 30a outputs progress information indicating that printing is finished via the communication section 30b. The information is transmitted to the server 10 via the print work terminal 24 and the print job management terminal 23. When the server 10 acquires the information via the communication section 10b, the processor 10a of the server 10 updates progress information of the print job 10c1 printing of which is finished to "printing is finished."

(2) Print Control Processing

Figure 6:
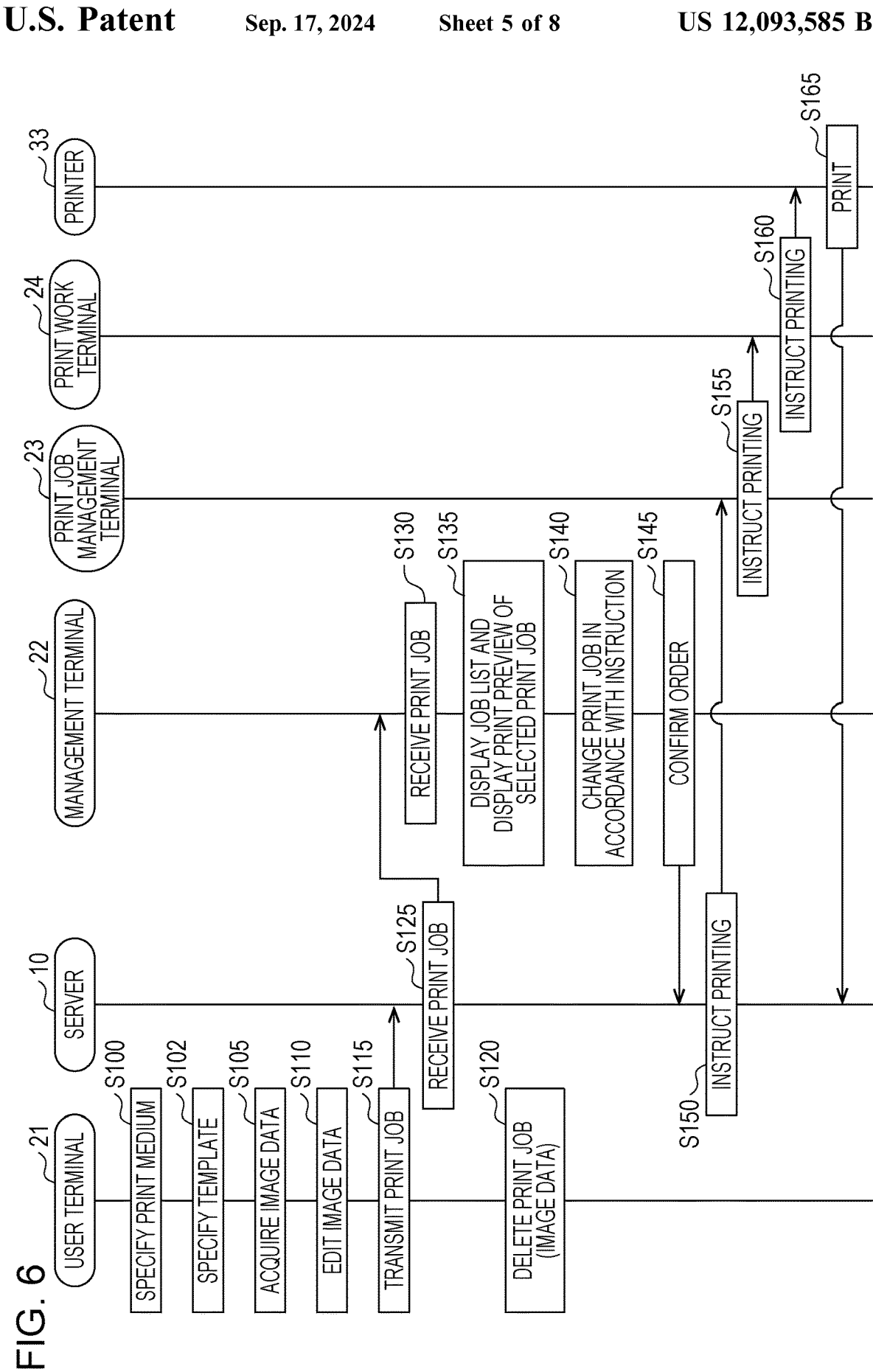
FIG. 6 is a sequence diagram of print control processing.

FIG. 6 is a sequence diagram illustrating print control processing. When the user starts the design application of the user terminal 21, the processor 21a of the user terminal 21 displays options of print media. The options are, for example, a T-shirt, a mug, a photobook, a smartphone case, or the like. When the user performs an operation of selecting a desired print medium from the options, the processor 21a specifies the selected print medium by a function of the specifying section 21a1 (Step S100).

Subsequently, the processor 21a displays options of templates. When the user selects a template, the processor 21a specifies the template by a function of the editing section 21a4 (Step S102). A template is data that defines a position, a size, or the like of an area in which image data is arranged on the print medium, and a plurality of types of templates are created in advance in accordance with types of the print media.

Subsequently, the processor 21a displays a screen to which the image data is input by a function of the acquisition section 21a2 and acquires the image data input by the user (Step S105). For example, the user may record image data that the user desires to use for printing in a mobile terminal owned by the user himself or herself, may record the image data in a cloud server, and may record the image data in a memory card or the like to carry the image data in the store. In any case, the user performs an operation of transmitting the image data recorded in various recording media to the user terminal 21, and thus, the processor 21a acquires the image data.

Subsequently, the processor 21a edits the image data in accordance with an operation of the user by a function of the editing section 21a4 (Step S110). For example, the user adds a character, adjusts a position, a color, and a font of each character, and applies an effect on a photograph to edit the image data. As described above, the user can edit the image data for producing an item with an original design by using the design application of the user terminal 21.

Subsequently, when the user performs an operation of indicating a temporary order using the design application, the processor 21a transmits a print job by a function of the transmission section 21a3 (Step S115). That is, the processor 21a transmits the print job to the server 10.

In response to success of transmission of the print job, the processor 21a deletes the print job by a function of the deletion section 21a5 (Step S120). That is, the print job is deleted from the user terminal 21. Since the user terminal 21 is a terminal used by unspecified users (any customer of the store), it is assumed that, when an image designed by each user is kept stored in the user terminal 21, a probability that another user browses the image. Therefore, as in this embodiment, leakage and outflow of user-specific information can prevented by deleting the print job already transmitted from the user terminal 21 in accordance with transmission of the print job to the server 10 after finishing designing of the image. Note that the image data may be configured to be deleted from the user terminal 21 after transmission of the image data from the user terminal 21 and at least before the image data is accessed next, and the image data may be deleted in accordance with a trigger other than a trigger of determination on success of transmission of the print job as described above.

Upon receiving the print job from the user terminal 21, the server 10 transmits the print job to the management terminal 22 (Step S125). Note that, in this embodiment, at this timing, the processor 10a of the server 10 assigns a reference number and a password to the temporarily ordered print job, and outputs print data indicating the reference number and the password to the user terminal 21. The user terminal 21 outputs the print data to the receipt printer 31 to cause the receipt printer 31 to print a receipt indicating the reference number and the password. When printing is finished, the print data indicating the receipt is deleted from the user terminal 21. The user receives the printed receipt (with the reference number and the password described thereon) from the receipt printer 31 and moves to the reception counter. Note that, since it is only needed to inform the reference number and the password, a message including the reference number and the password may be transmitted to the mobile terminal owned by the user, instead of printing the receipt.

The processor 22a of the management terminal 22 receives the print job by a function of the reception section 22a1 (Step S130). At this time, the processor 22a receives the reference number and the password of the print job with the print job from the server 10. Note that the reference number is indicated on a job list that will be described later, or the like, and the administrator can identify the print job by the corresponding reference number. The processor 22a of the management terminal 22 does not display the password on a display 20d because the password is used as evidence indicating that confirmation of the order is not based on determination by only the administrator but is agreed by the user. That is, the management terminal 22 is configured such that the administrator cannot recognize the password.

Subsequently, by a function of the display section 22a2, the processor 22a displays the job list, displays a preview of the print job selected from the job list (Step S135), and changes the print job in accordance with an instruction (Step S140). The processor 22a displays received print jobs in a list form. Specifically, for example, when the administrator performs an operation of displaying the job list or an operation of updating display of the job list on the management terminal 22, the job list is displayed on the display 20d of the management terminal 22.

FIG. 7 illustrates an example of a temporary order job list screen. In a job list of temporarily order print jobs, print jobs under temporary order, that is, print jobs orders of which have not been confirmed based on agreements with users yet, are listed. In the temporary order job list, a reference number, a print medium, the number of copies, a pick-up time of a finished item, a reception date and time, or the like of each print job under temporary order are displayed. The pick-up time corresponds to a print schedule in this embodiment. It is possible to inform the user of a time at which the user can receive the finished item by displaying the pick-up time. The pick-up time is a time set based on the work schedule 10c2 and, as the pick-up time, a print end time is set or, for an order that needs post-processing, a time at or after a post-processing end time is set.

Figure 8:
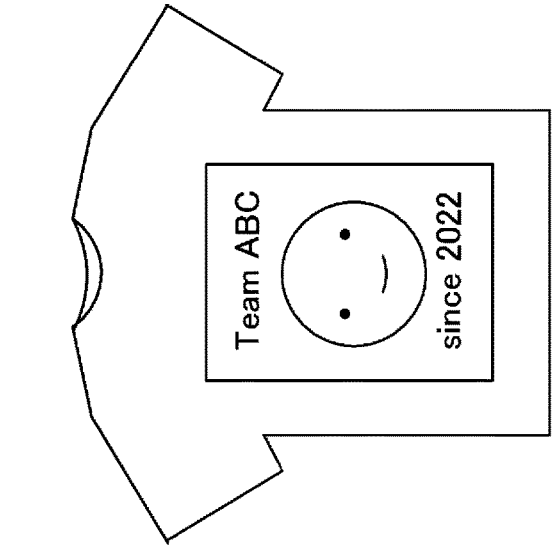
FIG. 8 is a view illustrating an example of an order content check screen.

When one print job is selected from the job list, the processor 21a cause the display 20d of the management terminal 22 to display a print preview of the selected print job. FIG. 8 illustrates an example of an order content check screen in which a print job surrounded by a broken line is selected from the job list illustrated in FIG. 7. As illustrated in FIG. 8, the order content check screen includes a pick-up time g3, a delivery number designating section g4, a stock number g5, an editing button g6, a return button g7, a total amount g8, a password input button g9, and an order button g10.

The preview image will be described. The preview image is an image obtained by arranging an image trimmed into a size and a shape indicated by a template selected by the user in a position indicated by the template in a print medium selected by the user. When a size, a color tone, or the like of the image is adjusted by the user, the adjustment is reflected to the preview. When a character is added by the user, in the preview image, the character is arranged in a position determined by the template or a position designated by the user.

The pick-up time g3 is the same as the time displayed in FIG. 7 and, as described above, is a time set based on the work schedule 10c2. When the administrator consults with the user and changes an order number or the like, the pick-up time can be also changed.

In the delivery number designating section g4, the order number designated by the user in placing a temporary order is displayed. The administrator checks the order number with the user again and can change the order number in the delivery number designating section g4, as necessary. Note that the processor 22a causes the stock number g5 indicating a stock status of print media to be displayed with the print preview in the order content check screen by the function of the display section 22a2. The stock number g5 is the number of stocked print media indicated in a print preview g2 and the stock data 10c3 is referred to and is displayed. With the pick-up time g3 and the stock number g5 displayed, the administrator can recognize the pick-up time and the number of stocked print media and can refer to the pick-up time and the number of stocked print media, for example, when changing the order number.

The editing button g6 is a button used for editing an image a design of which has been once fixed by the user at the user terminal 21 (that is, an image representing a temporarily ordered design) again at the management terminal 22. That is, the processor 22a can further edit image data that has been already edited at the user terminal 21 by a function of the changing section 22a3. When the editing button g6 is selected, the processor 22a displays an editing screen (not illustrated) on the display 20d of the management terminal 22. The administrator can edit the image data on the editing screen, as consulting with the user. For example, when the print medium is a T-shirt with a chest pocket and a main portion of the image overlaps a position of the pocket, the administrator can tell that to the user and shifts an arrangement of the image such that the main portion of the image does not overlap the pocket, or the like, as necessary, at the management terminal 22. When editing is performed on the editing screen, the processor 22a updates the image data of the print job with edited contents. When an operation of finishing editing is performed, the processor 22a returns display of the display 20d to the order content check screen of FIG. 8 from the editing screen (not illustrated).

In Step S140 of a sequence of FIG. 6, as described above, the administrator can change contents of the temporarily ordered print job as consulting with the user. Note that, when there is no need to change the contents of the temporarily ordered print job at the management terminal 22, Step S140 is omitted. In the order content check screen of FIG. 8, the return button g7 is a button used for returning an image a design of which has been once fixed by the user at the user terminal 21 to the user terminal 21 and causing the user to re-edit the image at the user terminal 21. A sequence of returning will be described later. The total amount g8 indicates, for example, a total amount of items under temporary order placed by the same user.

In FIG. 8, the password input section g9 is an input section via which a password used for confirming a temporary order and placing an actual order is input. The password is informed to the user by a receipt or the like in placing the temporary order, and is information that the user recognizes but the administrator does not recognize. The order button g10 is a button used for confirming a temporary order and placing an actual order.

After making various changes to the print job in Step S140 of the sequence of FIG. 6 (after finishing Step S135 when there is no need to make any change), the administrator performs a confirmation operation. In this embodiment, the processor 22a confirms an order by a function of the confirmation section 22a4 on a condition that the password is input by the user. That is, the administrator causes the user to input the password to the password input section g9 and the administrator or the user operates the order button g10. The processor 22a determines that an agreement with the user has been reached and confirms the order (Step S145). Upon confirming the order, the processor 22a transmits the print job indicating confirmed order contents to the server 10.

The management terminal 22 generates an order form indicating the confirmed order contents and transmits the order form to the document printer 32 to cause the document printer 32 to print the order form. The administrator gives the order form to the user and the user keeps the order form. For example, at a time of receiving an item, the user can show the order form to a store staff at an item delivery counter and the staff can use the order form to check the user and the item, or the like.

Upon receiving the confirmed print job, the server 10 transmits a print instruction of the print job to the print job management terminal 23 (Step S150). Also, upon receiving the confirmed print job, the server 10 updates a status of the print job to "confirmed." The confirmed print job is presented in a list form on a screen that is displayed by selecting a tab of a confirmed case indicated in FIG. 7. For confirmed print jobs, progress information (for example, before a work, during performing pre-processing, during printing, or the like) is presented for each job.

Upon receiving the print instruction of the print job from the server 10, a processor of the print job management terminal 23 selects a printer corresponding to a type of a print medium indicated by the print job and transmits the print instruction of the print job to the print work terminal 24 in which an application and a printer driver corresponding to the selected printer are installed (Step S155).

When the print work terminal 24 receives the print instruction, the print worker operates the print work terminal 24 to transmit the print instruction to the printer 33 corresponding to the print job (Step S160). Note that the print worker refers to the work schedule 10c2 recorded in the server 10 and performs a work (pre-processing before printing, printing, post-processing after printing, or the like) related to printing of the print job in a work time slot set in the work schedule 10c2. When the print job needs pre-processing before printing, after performing the pre-processing before printing, the print worker sets a print medium in the printer and inputs the print instruction to the print work terminal 24. The print work terminal 24 converts image data indicated by the print job to print data in a format suitable to printing in the printer, based on a print setting, and transmits the print instruction with the print data to the printer.

The printer 33 that has received the print instruction executes printing, based on the received print data (Step S165). When printing is finished, the printer 33 informs the server 10 that printing is finished via the print work terminal 24 and the print job management terminal 23. When the print job needs post-processing, the print worker performs the post-processing on the print medium after printing to complete an ordered item. The administrator can deliver the completed item to the user at around a pick-up time. Upon delivering the item to the user, for example, the administrator operates the management terminal 22 to update the status of the print job with an order number indicating the item to "delivered."

As has been described, according to this embodiment, the administrator can change a print job temporarily ordered by the user once by performing designing at the user terminal 21 as consulting with the user at the management terminal 22. For example, there is a probability that, when the administrator informs the user of confirmation items and concerns (for example, a harmful effect caused depending on a thickness of fabric of a T-shirt with a chest pocked, a position of an opening for a camera lens in a smartphone, or the like) for printing at a time of receiving an order, a customer desires to partially change a design in response. In such a case, the user and the administrator can communicate with each other to immediately change the design and also reach an agreement on contents thereof. As a result, a probability that a printed material ordered by the user does not match an image of the user can be reduced.

Note that the printing system is configured such that, after the print job is transmitted to the management terminal 22 via the server 10, the image data can be re-edited at the user terminal 21. FIG. 9 is a sequence diagram of a case where, after processing up to Step S135 in FIG. 6 is executed, the print job is returned to the user terminal 21 and re-editing of the print job is performed at the user terminal 21. As illustrated in FIG. 9, after the order content check screen (FIG. 8) including the print preview g2 is displayed at the management terminal 22 in Step S135, when the return button g7 is operated, the processor 22a of the management terminal 22 returns the print job to the user terminal 21 by the function of the returning section 22a6 (Step S200). That is, the processor 22a of the management terminal 22 transmits the print job to the server 10. When there are a plurality of user terminals 21, at this time, the processor 22a transmits the print job with identification information of one of the user terminals 21 as a return destination. The processor 10a of the server 10 transmits the print job returned from the management terminal 22 to the user terminal 21 designated as a return destination. By doing so, it is possible to cause the processor 22a to transmit the print job to the user terminal 21 at which the user performs an editing work and not to transmit the print job to the other user terminals 21.

The user terminal 21 is configured such that, when a print job is transmitted to the server 10 in Step S115, the print job is deleted from the user terminal 21, so that, when the print job is returned from the server 10, editing of image data of the print job is enabled again at the user terminal 21. Upon receiving the print job from the 10, the processor 21a of the user terminal 21 edits the returned print job by a function of the editing section 21a4 (Step S110). In and after Step S110, as illustrated in FIG. 6, printing of the print job may be confirmed at the management terminal 22 after the print job is re-edited and then executed, and may be confirmed without being re-edited at the management terminal 22 (Step S140) and then executed. As another option, as illustrated in FIG. 9, the print job can be returned to the user terminal 21 again. As described above, the printing system is configured such that, after a temporary order is placed once and a print job is transmitted to the server 10, the print job can be edited again at the user terminal 21, so that, for example, when the user desires largely change the image data in accordance with an advice of the administrator, or the like, an opportunity to take time to re-edit the image data at the user terminal 21, not the reception counter, can be given to the user.

(3) Other Embodiments

The above-described embodiment is an example for implementing the present disclosure, and various other embodiments can be employed. For example, the type of the printer described in the above-described embodiment is merely an example, and other printers that can perform printing on a variety of media may be employed. For example, for printing on a mug, a pinback button, a smartphone case, or the like, a printer that preforms printing directly on a stereoscopic object by a robot arm or the like, in addition to a sublimation transfer method, may be employed.

The management terminal 22 and the user terminal 21 may be configured to directly transmit and receive information of a print job or the like not via the server 10. The print job management terminal 23 and the print work terminal 24 may be configured as a single terminal and may be omitted (a print job may be transmitted directly to the printer 33 from the management terminal 22, and a print job may be directly transmitted to the printer 33 from the server 10). As long as the administrator can specify a print job from a user, a reference number may not be used and, for example, the management terminal 22 and the user terminal 21 may be configured to correspond in a one-to-one manner, so that only a print job transmitted from the corresponding user terminal 21 is displayed at the management terminal 22.

Each of the terminals and the printers may be configured on an assumption that a terminal or a printer is not installed in a store that a user visits. A terminal may be installed in a store, a printer may be installed in a printing facility of a printing company, and a printed material may be delivered to a customer who ordered the printed material from the printing facility. Moreover, a terminal may not be installed in a store, and the printing system may be configured such that a user can place an order, perform editing of print data, and give a final print instruction from various places via a portable terminal.

A print schedule of a print job may be represented by a pick-up time of a finished item, and may include a schedule of each process step in addition to a final pick-up time. The pick-up time may be changeable, for example, to a time at or after completion of the item depending on consultation with the user. Thus, an approximate time when, after the user goes out of the store, the user returns to the store to receive an item can be made to be the pick-up time. Note that, in such a case, depending on an availability of a printer or the like in the schedule thereof, production of an item of another user an order of which is confirmed after the order of the user can be performed before production of an item of the user the order of which is confirmed before.

The management terminal may be configured to further include a billing section 22a5 that causes a point of sales (POS) system to charge a fee based on confirmed printing. That is, the printing system may be configured to be communicable with the POS system (not illustrated) and may be configured such that the billing section 22a5 transmits information indicating a charged price, including a unit price of a confirmed item, the number of the items, or the like, to a POS terminal, and the POS system settles the price.

The confirmation section may be configured to determine whether the user and the administrator have reached an agreement by various methods. For example, the confirmation section may be configured to, when an operation of indicating confirmation of the order is performed at the management terminal 22 without a password, trust the administrator, determine that the user and the administrator have reached an agreement, and confirm printing. Specifically, the confirmation section may be configured such that, after the print job 10c1 is transmitted to the management terminal 22 from the user terminal 21, a similar screen to a screen displayed on the management terminal 22 is displayed at the user terminal 21, so that the administrator and the user check order contents as viewing the respective terminals. In order to confirm the order, the user performs an operation of indicating confirmation of the order at the user terminal 21, and the administrator performs an operation of indicating confirmation of the order at the management terminal 22. When the order configuration operations are performed at both the terminals, the server 10 determines that the user and the administrator have reached an agreement to confirm the order. That is, when the order confirmation operation is performed at both the terminal used by the user and the terminal used by the administrator, the server 10 determines that the user and the administrator have reached an agreement to confirm the order. Note that, in this case, the printing system may be configured such that the print job 10c1 is deleted from the user terminal 21 after the order is confirmed.

Note that, when the confirmation section confirms printing on a condition that a password is input by the user, the password may be at least a password that is recognized by the user and is not recognized by the administrator. Therefore, as described above, in addition to a configuration where, each time a temporary order is placed, a password is generated in the printing system in association with a print job and is informed to the user, for example, a configuration where a password designated by the user when the user performed member registration for a print service or the like is used as evidence that the user agrees on confirmation of the order may be employed. In the above-described embodiment, an example where password check is performed at the management terminal 22 is described, but the printing system may be configured such that password check is performed at the server 10 and a check result is transmitted to the management terminal 22.

The changing section of the management terminal 22 is not limited to a section that can change both a design and the number of copies. For example, the changing section may be configured to cancel printing itself, and may change the number of copies only. When the changing section of the management terminal 22 cannot change a design, the management terminal 22 may be configured to return the design to the user terminal 21 to enable change of the design using the user terminal 21.

The display section may be configured to display a print preview in any manner. For example, the display section may be configured to display a print preview using a monitor of a personal computer as a display, display a print preview using a smart glass as a display, and display a print preview on a screen as a display by projecting the print preview thereon.

The present disclosure can be established as a disclosure of a non-transitory computer-readable storage medium storing a print control program that causes the user terminal 21 to function as the specifying section 21a1, the acquisition section 21a2, and the transmission section 21a3, causes the management terminal 22 to function as the reception section 22a1, the display section 22a2, the changing section 22a3, and the confirmation section 22a4, and causes the printer 33 to function as the printing section.

The present disclosure can be established as a disclosure of a method for generating a printed material, the method including causing a user to specify a print medium, acquiring image data, and transmitting a print job including the print medium specified by the user and the image data to a management terminal by a user terminal, receiving the print job, displaying a list of received print jobs such that one of the print jobs can be selected and displays a print preview based on the print medium and the image data included in the selected print job, changing the print job in accordance with an instruction, and confirming execution of printing, based on the print job in accordance with an agreement between the user and an administrator by an management terminal, and performing printing based on the confirmed print job by a printer.

Furthermore, the present disclosure can be applied as a program or a method executed by a computer. The system, the program, and the method described above may be realized as a single device in some cases, may be realized using components of a plurality of devices in other cases, and include a variety of aspects. Also, changes and variations can be appropriately made thereto, for example, such that a part is a software and another part is hardware. Furthermore, the present disclosure can be established as a recording medium storing a program that controls a system. Needless to say, the recording medium storing a program may be a magnetic recording medium and may be a semiconductor memory, and the same is applied to any recording medium that will be developed in the future.

What is claimed is:

1. A printing system, comprising:
 a user terminal that includes a first processor configured to:
  cause a user to specify a print medium,
  acquire image data, and
  transmit a print job including the print medium specified by the user and the image data;
 a management terminal that includes a second processor configured to:
  receive the print job,
  display a list of print jobs such that the print job from the list of print jobs is selected,
  display a print preview based on the print medium and the image data included in the selected print job,
  change the selected print job in accordance with an instruction of an administrator,
   wherein the first processor is further configured to receive a user operation of the user indicating agreement related to the changed print job,
  receive an administrator operation of the administrator indicating the agreement related to the changed print job, and
  confirm execution of printing based on the user operation of the user and the administrator operation of the administrator; and
 a printer including a printing section configured to perform the printing based on the confirmation of the execution of the printing.

2. The printing system according to claim 1, wherein the second processor is further configured to display a stock status of the print medium with the print preview.

3. The printing system according to claim 1, wherein the second processor is further configured to display a print schedule.

4. The printing system according to claim 1, wherein the second processor is further configured to cause a POS to charge a fee based on the confirmation of the execution of the printing.

5. The printing system according to claim 1, wherein
 the first processor is further configured to edit the image data in accordance with an instruction of the user, and
 the second processor is further configured to edit the edited image data.

6. The printing system according to claim 1, wherein the first processor is further configured to delete the image data after transmission of the image data.

7. The printing system according to claim 1, wherein
 the second processor is further configured to return the print job to the user terminal, and
 the first processor is further configured to edit the returned print job.

8. The printing system according to claim 1, wherein the second processor is further configured to confirm the printing on a condition that a password is input by the user.

9. The printing system according to claim 1, wherein
 the second processor is further configured to transmit the changed print job to the user terminal for the agreement related to the changed print job, and
 the first processor is further configured to receive the changed print job.

10. A printing system, comprising:
 a processor configured to:
  display a print preview based on a print setting including specification of a print medium set by a user and image data;
  change the print setting in accordance with an instruction of an administrator;
  receive an administrator operation of the administrator indicating agreement related to the changed print setting; and
  cause a printer to execute printing based on a user operation of the user indicating the agreement related to the changed print setting and the administrator operation of the administrator indicating the agreement related to the changed print setting.

11. A non-transitory computer-readable storage medium storing instructions which, when executed by a processor, cause the processor to execute operations, the operations comprising:

displaying a print preview based on a print setting including specification of a print medium set by a user and image data;

changing the print setting in accordance with an instruction of an administrator;

receive an administrator operation of the administrator indicating agreement related to the changed print setting; and causing a printer to execute printing based on a user operation of the user indicating the agreement related to the changed print setting and the administrator operation of the administrator indicating the agreement related to the changed print setting.

* * * * *